US009964835B2

(12) United States Patent
Matsumura

(10) Patent No.: US 9,964,835 B2
(45) Date of Patent: May 8, 2018

(54) SHAKE CORRECTION METHOD, IMAGING DEVICE PROVIDED WITH SAME, INTERCHANGEABLE LENS DEVICE, AND CAMERA BODY

(71) Applicant: Panasonic Intellectual Property Management Co., Ltd., Osaka (JP)

(72) Inventor: Yoshio Matsumura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days. days.

(21) Appl. No.: 15/638,949

(22) Filed: Jun. 30, 2017

(65) Prior Publication Data
US 2017/0299944 A1 Oct. 19, 2017

Related U.S. Application Data

(63) Continuation of application No. PCT/JP2016/004292, filed on Sep. 20, 2016.

(30) Foreign Application Priority Data

Jan. 15, 2016 (JP) .................................. 2016-005687

(51) Int. Cl.
G03B 17/14 (2006.01)
G03B 17/00 (2006.01)
(Continued)

(52) U.S. Cl.
CPC ................ G03B 5/02 (2013.01); G03B 5/04 (2013.01); G03B 5/06 (2013.01); G03B 5/08 (2013.01);
(Continued)

(58) Field of Classification Search
None
See application file for complete search history.

(56) References Cited

U.S. PATENT DOCUMENTS 6,781,622 B1 8/2004 Sato et al.
2002/0080242 A1* 6/2002 Takahashi .............. H04N 5/217
348/207.99
(Continued)

FOREIGN PATENT DOCUMENTS

JP 2000-81646 3/2000
JP 2005-189654 7/2005
(Continued)

OTHER PUBLICATIONS

International Search Report dated Dec. 27, 2016 in International (PCT) Application No. PCT/JP2016/004292.

Primary Examiner — W B Perkey
(74) Attorney, Agent, or Firm — Wenderoth, Lind 7 Ponack, L.L.P.

(57) ABSTRACT

A shake correction method for a camera satisfies $1 < f \tan \omega / Y$ and includes, when recording an image: driving, by a first shake corrector, a shake correction lens group so that a movement amount thereof with respect to a rotational shake around an axis passing through the optical axis and parallel to a short side of the image is larger than that with respect to a rotational shake around an axis passing through the optical axis and parallel to a long side of the image; and driving, by a second shake corrector, an imaging element so that a movement amount thereof with respect to the rotational shake around the axis passing through the optical axis and parallel to the short side of the image is smaller than that with respect to the rotational shake around the axis passing through the optical axis and parallel to the long side of the image.

7 Claims, 11 Drawing Sheets

(51) Int. Cl.
*H04N 5/232* (2006.01)
*G03B 5/02* (2006.01)
*G03B 5/08* (2006.01)
*G03B 5/04* (2006.01)
*G03B 5/06* (2006.01)

(52) U.S. Cl.
CPC ......... *G03B 17/14* (2013.01); *H04N 5/23287* (2013.01); *G03B 2205/0015* (2013.01); *G03B 2205/0038* (2013.01)

(56) References Cited

U.S. PATENT DOCUMENTS

| | | |
|---|---|---|
| 2005/0001906 A1 | 1/2005 | Sato et al. |
| 2005/0140793 A1 | 1/2005 | Kojima et al. |
| 2007/0031134 A1 | 2/2007 | Kuroda et al. |
| 2010/0322607 A1 | 12/2010 | Kuroda et al. |
| 2015/0264266 A1 | 9/2015 | Katsuyama et al. |
| 2015/0271410 A1 | 9/2015 | Shintani et al. |
| 2015/0281581 A1* | 10/2015 | Sakurai ............... H04N 5/23287 348/208.2 |
| 2016/0134814 A1* | 5/2016 | Yoneyama ......... H04N 5/23287 348/208.11 |
| 2016/0182828 A1* | 6/2016 | Ikeda ................. H04N 5/23245 348/208.5 |
| 2016/0261806 A1* | 9/2016 | Honjo ................ H04N 5/23209 |
| 2016/0330377 A1 | 11/2016 | Tsuchiya |
| 2016/0330378 A1 | 11/2016 | Tsuchiya |
| 2017/0299944 A1* | 10/2017 | Matsumura .............. G03B 5/02 |

FOREIGN PATENT DOCUMENTS

| | | |
|---|---|---|
| JP | 2006-239647 | 9/2006 |
| JP | 2007-33879 | 2/2007 |
| JP | 2015-141390 | 8/2015 |
| JP | 2015-141391 | 8/2015 |
| JP | 2015-187712 | 10/2015 |
| JP | 2015-194687 | 11/2015 |
| WO | 2015/115132 | 8/2015 |
| WO | 2015/119252 | 8/2015 |

\* cited by examiner

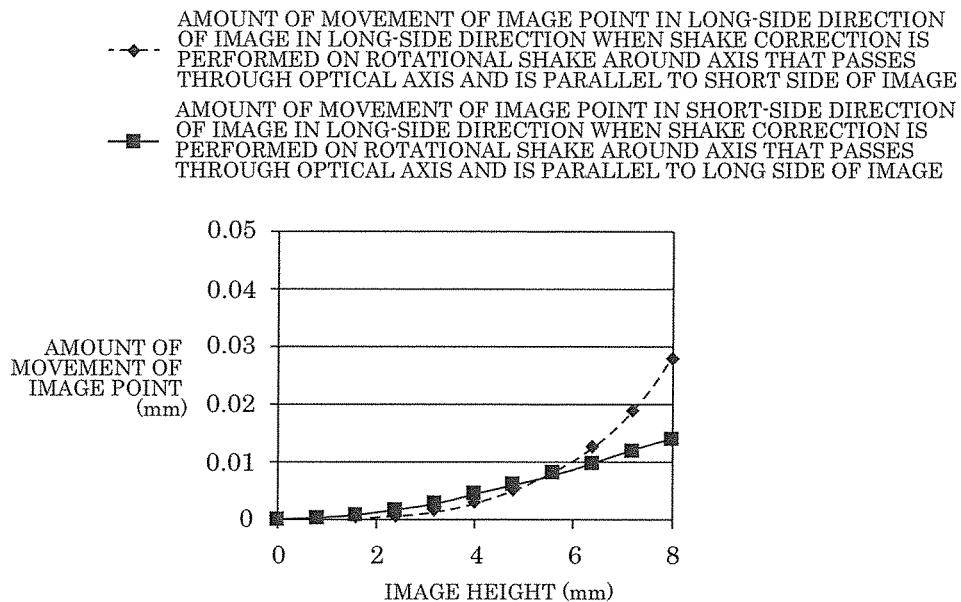

FIG. 9
- - ♦ - - AMOUNT OF MOVEMENT OF IMAGE POINT IN LONG-SIDE DIRECTION OF IMAGE IN LONG-SIDE DIRECTION WHEN SHAKE CORRECTION IS PERFORMED ON ROTATIONAL SHAKE AROUND AXIS THAT PASSES THROUGH OPTICAL AXIS AND IS PARALLEL TO SHORT SIDE OF IMAGE
— ■ — AMOUNT OF MOVEMENT OF IMAGE POINT IN SHORT-SIDE DIRECTION OF IMAGE IN LONG-SIDE DIRECTION WHEN SHAKE CORRECTION IS PERFORMED ON ROTATIONAL SHAKE AROUND AXIS THAT PASSES THROUGH OPTICAL AXIS AND IS PARALLEL TO LONG SIDE OF IMAGE

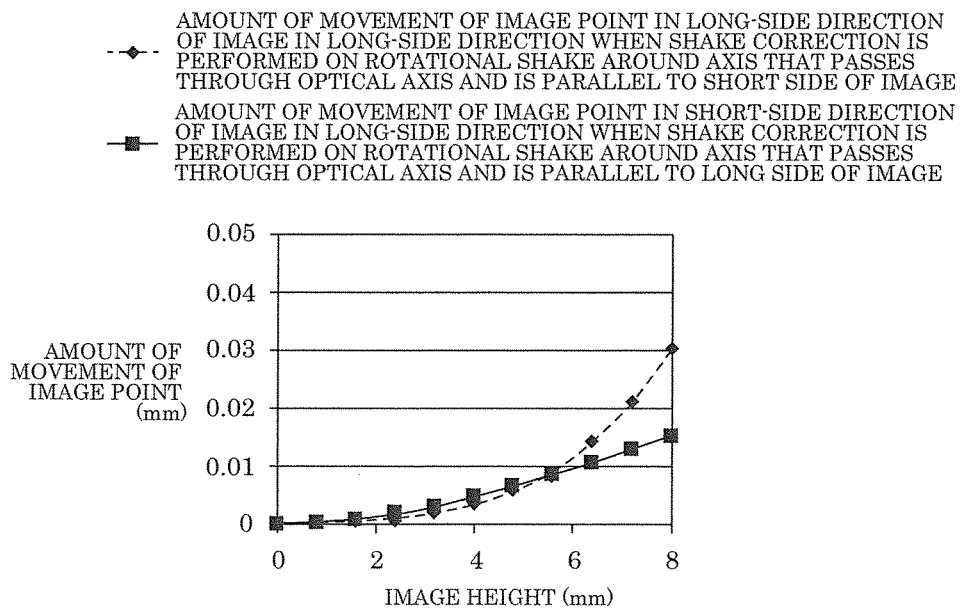

FIG. 10
- - ♦ - - AMOUNT OF MOVEMENT OF IMAGE POINT IN LONG-SIDE DIRECTION OF IMAGE IN LONG-SIDE DIRECTION WHEN SHAKE CORRECTION IS PERFORMED ON ROTATIONAL SHAKE AROUND AXIS THAT PASSES THROUGH OPTICAL AXIS AND IS PARALLEL TO SHORT SIDE OF IMAGE
— ■ — AMOUNT OF MOVEMENT OF IMAGE POINT IN SHORT-SIDE DIRECTION OF IMAGE IN LONG-SIDE DIRECTION WHEN SHAKE CORRECTION IS PERFORMED ON ROTATIONAL SHAKE AROUND AXIS THAT PASSES THROUGH OPTICAL AXIS AND IS PARALLEL TO LONG SIDE OF IMAGE

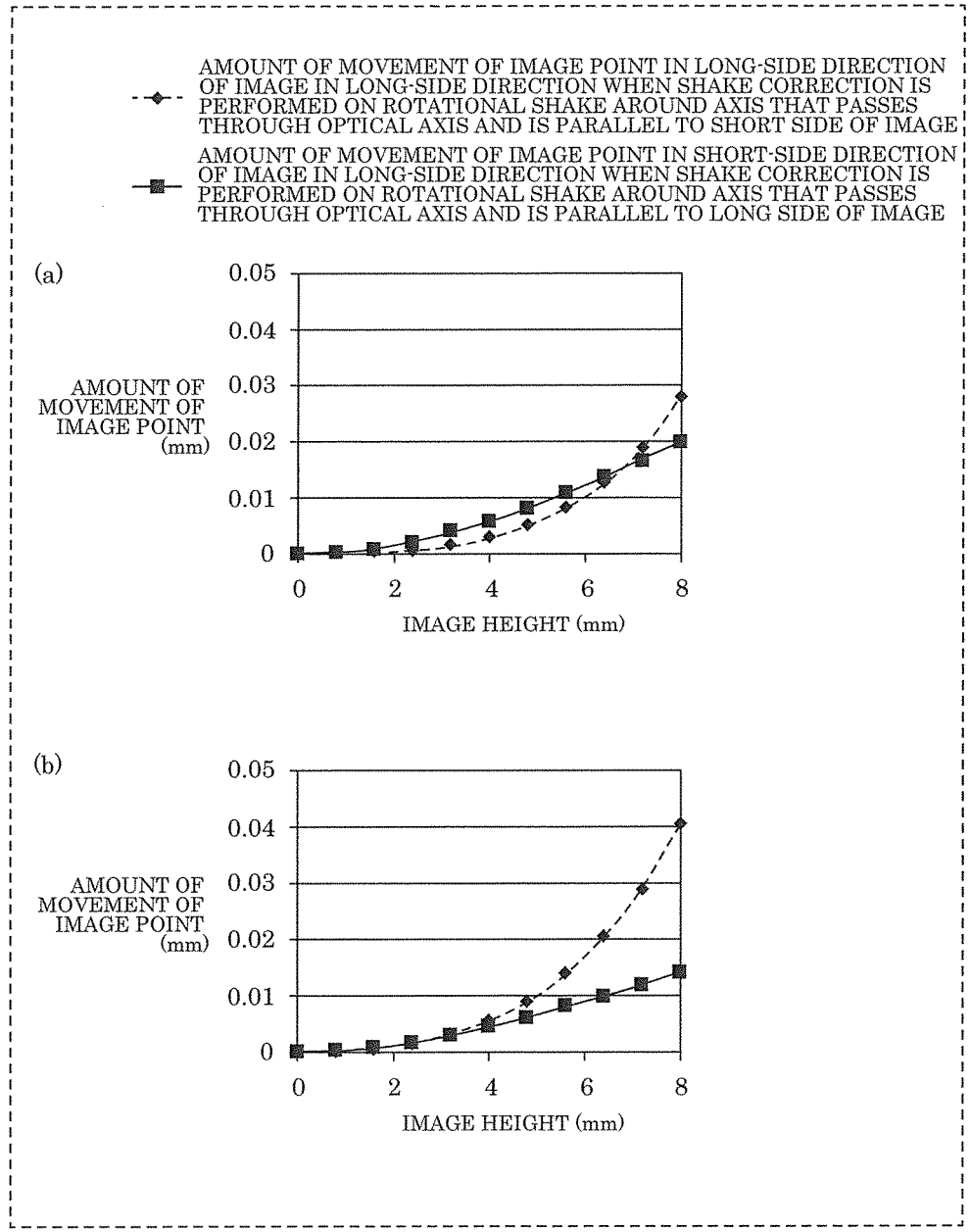

SHAKE CORRECTION METHOD, IMAGING DEVICE PROVIDED WITH SAME, INTERCHANGEABLE LENS DEVICE, AND CAMERA BODY

CROSS REFERENCE TO RELATED APPLICATIONS

This application is a U.S. continuation application of PCT International Patent Application Number PCT/JP2016/004292 filed on Sep. 20, 2016, claiming the benefit of priority of Japanese Patent Application Number 2016-005687 filed on Jan. 15, 2016, the entire contents of which are hereby incorporated by reference.

BACKGROUND

1. Technical Field

The present disclosure relates to a method of controlling correction of shake caused by, for example, hand movement, and to an imaging device provided with the method.

2. Description of the Related Art

As a commonly-known phenomenon, off-axis image quality decreases after shake correction because an image point on an axis is stationary but an image point at an off-axis position is not.

Japanese Unexamined Patent Application Publications No. 2015-141390 and No. 2015-194687 each disclose an imaging device that implements two kinds of hand movement correction, one by shifting a lens and the other by shifting an imaging element.

SUMMARY

The present disclosure provides a shake correction control method and an imaging device provided with the method, by which an image quality decrease caused in shake correction can be suppressed.

A shake correction control method according to the present disclosure is a shake correction method for a camera which includes: a lens system; an imaging element that converts light from the lens system into an electric signal to generate an image; a first shake corrector that causes a shake correction lens group formed from a part of the lens system to move perpendicularly to an optical axis; and a second shake corrector that causes the imaging element to move perpendicularly to the optical axis, the shake correction method including, when a rectangular image is to be recorded: driving, by the first shake corrector, the shake correction lens group in a manner that an amount of movement of the shake correction lens group with respect to a rotational shake around an axis that passes through the optical axis and is parallel to a short side of the image is larger than an amount of movement of the shake correction lens group with respect to a rotational shake around an axis that passes through the optical axis and is parallel to a long side of the image; and driving, by the second shake corrector, the imaging element in a manner that an amount of movement of the imaging element with respect to the rotational shake around the axis that passes through the optical axis and is parallel to the short side of the image is smaller than an amount of movement of the imaging element with respect to the rotational shake around the axis that passes through the optical axis and is parallel to the long side of the image. The shake correction method satisfies a condition: $1 < f \tan \omega / Y$ (where f represents a focal length of the lens system, ω represents a half angle of view of the lens system, and Y represents an image height).

Moreover, an imaging device according to the present disclosure includes: a lens system; an imaging element that converts light from the lens system into an electric signal to generate an image; a first shake corrector that causes a shake correction lens group formed from a part of the lens system to move perpendicularly to an optical axis; and a second shake corrector that causes the imaging element to move perpendicularly to the optical axis. When a rectangular image is to be recorded, the first shake corrector drives the shake correction lens group in a manner that an amount of movement of the shake correction lens group with respect to a rotational shake around an axis that passes through the optical axis and is parallel to a short side of the image is larger than an amount of movement of the shake correction lens group with respect to a rotational shake around an axis that passes through the optical axis and is parallel to a long side of the image, and the second shake corrector drives the imaging element in a manner that an amount of movement of the imaging element with respect to the rotational shake around the axis that passes through the optical axis and is parallel to the short side of the image is smaller than an amount of movement of the imaging element with respect to the rotational shake around the axis that passes through the optical axis and is parallel to the long side of the image. The imaging device satisfies a condition: $1 < f \tan \omega / Y$, (where f represents a focal length of the lens system, ω represents a half angle of view of the lens system, and Y represents an image height).

According to the present disclosure, an image quality decrease caused in shake correction can be suppressed effectively.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 9 is a diagram for describing a relationship between an amount of movement of an image point caused in shake correction at a wide angle end of a zoom lens system and an image height in a long-side direction, according to Numerical Example 1;

FIG. 10 is a diagram for describing a relationship between an amount of movement of an image point caused in shake correction at a wide angle end of a zoom lens system and an image height in a long-side direction, according to Numerical Example 2;

FIG. 12 is a diagram for describing a relationship between an amount of movement of an image point caused in shake correction at a wide angle end of a zoom lens system and an image height in a long-side direction, according to Comparative Examples 1 and 2.

DETAILED DESCRIPTION OF THE EMBODIMENT

Embodiment 1

Digital camera 1 (an example of a camera system) according to Embodiment 1 of the present disclosure is described, with reference to FIG. 1 to FIG. 5.

[1. Configuration]

[1-1. Configuration of Digital Camera]

Figure 1:
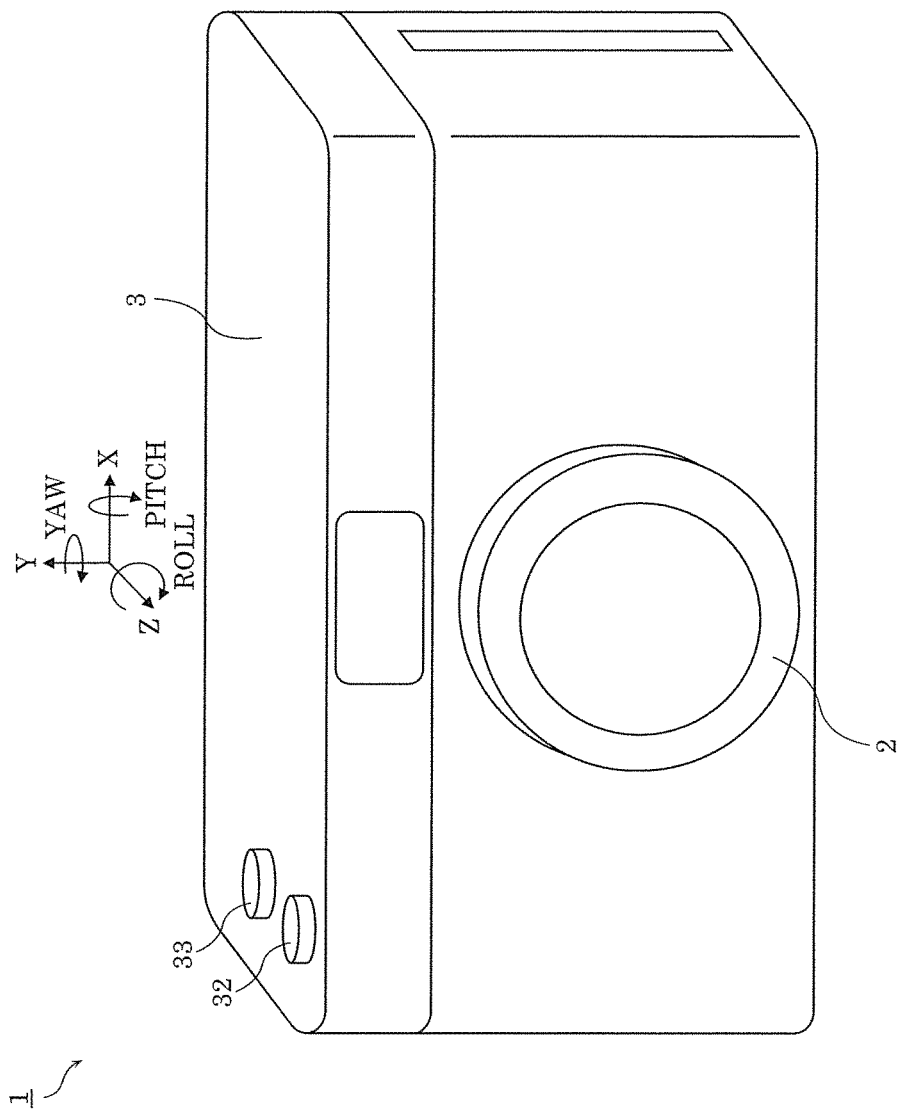
FIG. 1 is an external view of a digital camera according to the present disclosure.

FIG. 1 is a schematic external view of digital camera 1. Digital camera 1 includes interchangeable lens unit 2 and camera body 3. Interchangeable lens unit 2 is removably attached to camera body 3. On a top portion of camera body 3, shutter button 32 and power button 33 to be operated by a user are provided.

As shown in FIG. 1, a three-dimensional orthogonal coordinate system is set according to the present embodiment. To be more specific, digital camera 1 has: a Z-axis direction corresponding to an optical axis AZ; a Y-axis direction corresponding to a vertical direction in a horizontal shooting position of digital camera 1; and an X-axis direction corresponding to a horizontal direction in the horizontal shooting position of digital camera 1. It should be noted that these directions do not limit a manner in which digital camera 1 is used.

Here, a direction of rotation around the Z-axis is defined as a rolling direction. Moreover, a direction of rotation around the Y-axis direction is defined as a yawing direction, and a direction of rotation around the X-axis direction is defined as a pitching direction.

Assume that a rectangular image having a long side along the X-axis direction and a short side along the Y-axis direction is recorded. In this case, the pitching direction is a direction of rotation around an axis that passes through the optical axis AZ and that is parallel to the long side of the image. Moreover, the yawing direction is a direction of rotation around an axis that passes through the optical axis AZ and that is parallel to the short side of the image.

On the other hand, assume that a rectangular image having a short side along the X-axis direction and a long side along the Y-axis direction is recorded. In this case, the pitching direction is the direction of rotation around the axis that passes through the optical axis AZ and that is parallel to the short side of the image. Moreover, the yawing direction is the direction of rotation around the axis that passes through the optical axis AZ and that is parallel to the long side of the image.

Here, examples of the rectangular image also include an oval image that has a long axis and a short axis (the same applies to the scope of the claims).

Figure 2:
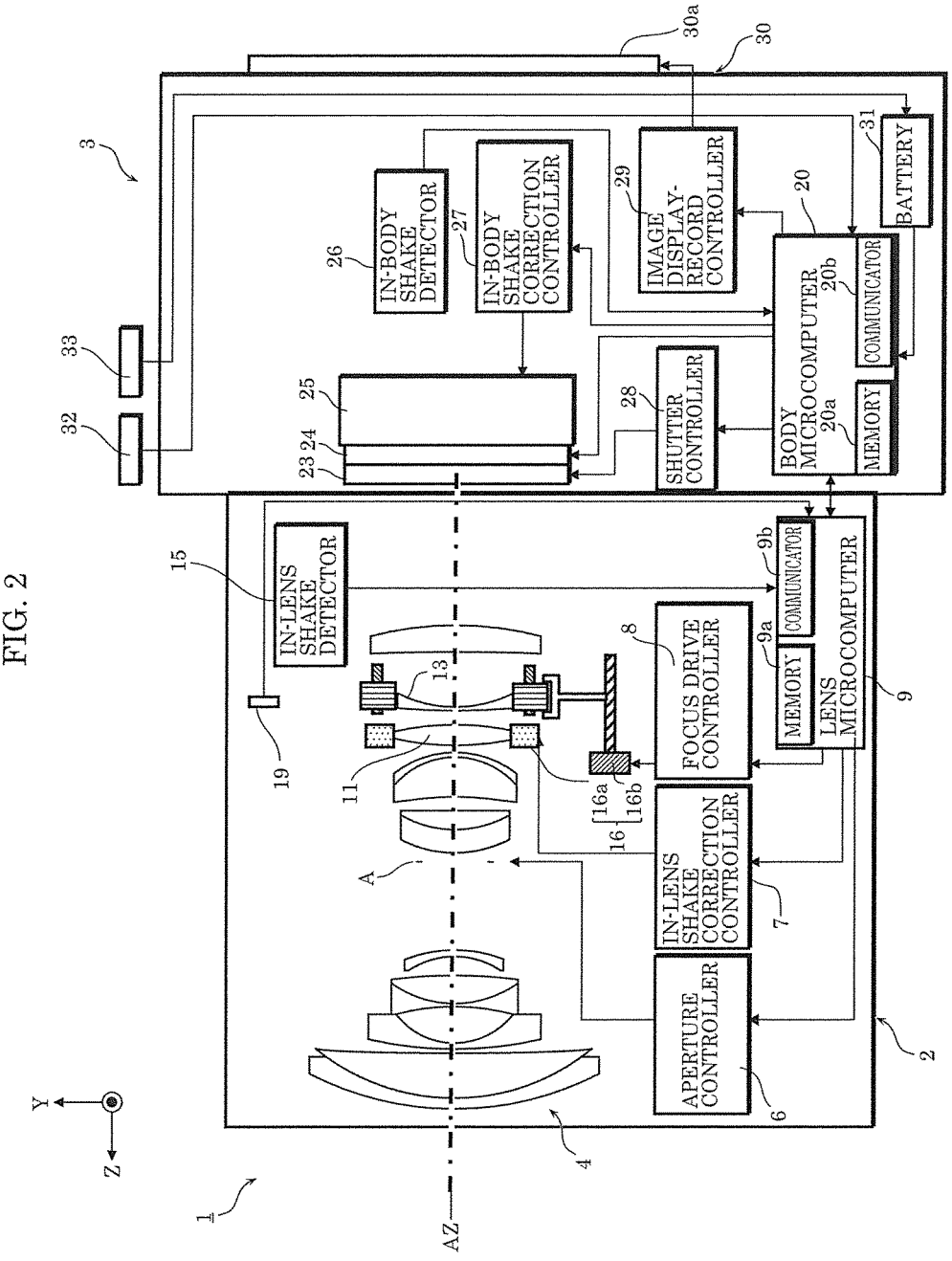
FIG. 2 is a schematic diagram showing a configuration of a digital camera according to Embodiment 1.

FIG. 2 is a schematic diagram showing an entire configuration of digital camera 1 that includes interchangeable lens unit 2 and camera body 3.

[1-2. Interchangeable Lens Unit]

Interchangeable lens unit 2 includes: lens system 4 (an example of a lens system) that includes a plurality of lens groups; lens-system driver 16 that drives lens system 4; various controllers that control lens-system driver 16; and aperture controller 6.

Lens system 4 includes shake correction lens group 11 and focus lens group 13 as shown in FIG. 2. Shake correction lens group 11 corrects a shake component that occurs to digital camera 1 during shooting.

Lens-system driver 16 includes in-lens shake correction mechanism 16a and focus driver 16b that has a lead screw and a rack, as shown in FIG. 2.

The various controllers which control lens-system driver 16 include in-lens shake correction controller 7, focus drive controller 8, photo sensor 19, and in-lens shake detector 15 that are shown in FIG. 2.

As shown in FIG. 2, interchangeable lens unit 2 further includes lens microcomputer 9 that is a controller of interchangeable lens unit 2.

In-lens shake correction mechanism 16a according to the present embodiment is attached to shake correction lens group 11. In-lens shake correction mechanism 16a can perform shake correction in the pitching direction and in the yawing direction to correct a rotational shake component, by moving shake correction lens group 11. It should be noted that the in-lens shake correction mechanism included in interchangeable lens unit 2 is not provided with a function of correcting the rotational shake component in the rolling direction.

In-lens shake detector 15 includes: an angle sensor that detects a shake caused in the pitching direction; an angle sensor that detects a shake caused in the yawing direction; an amplifier that amplifies a detection signal received from each of the angle sensors; and an analog-to-digital (A/D) converter circuit that digitizes each of the amplified detection signals and outputs the signal to lens microcomputer 9. In-lens shake detector 15 is connected to lens microcomputer 9 and detects the aforementioned rotational shake component. On the basis of a detection result, lens microcomputer 9 instructs in-lens shake correction controller 7 to perform shake correction.

In-lens shake correction controller 7 is connected to in-lens shake correction mechanism 16a. In-lens shake correction controller 7 performs drive control on in-lens shake correction mechanism 16a, according to the instruction from lens microcomputer 9. In-lens shake correction controller 7 and in-lens shake correction mechanism 16a form an in-lens shake corrector (an example of a first shake corrector).

Focus lens group 13 is connected to focus driver 16b. Focus driver 16b has the lead screw that is integral with a rotation axis of focus driver 16b and the rack that is attached to the lead screw. Motion of focus lens group 13 is converted from rotational motion to linear motion by the rack attached to the lead screw, according to driving of focus driver 16b.

With this, focus lens group 13 is driven on the optical axis AZ in the Z-axis direction, and thus an in-focus position is changed.

Focus driver 16b is connected to focus drive controller 8. Focus drive controller 8 performs drive control on focus driver 16b according to the instruction from lens microcomputer 9.

Photo sensor 19 detects a lens position, and then enters a position detection signal into lens microcomputer 9.

<Aperture Controller>

Aperture A is controlled by aperture controller 6. Aperture A is changed in aperture shape by an aperture blade (not illustrated) which is driven in an opening direction or a closing direction. By driving the aperture blade, an aperture value of lens system 4 can be changed.

Aperture controller 6 performs control to change an aperture diameter in accordance with a focal length and an in-focus position, according to an instruction from lens microcomputer 9.

<Lens Unit Controller>

Lens microcomputer 9 sends an instruction to each of in-lens shake correction controller 7, focus drive controller 8, and aperture controller 6. Each of the controllers performs drive control according to the instruction received from lens microcomputer 9. Moreover, lens microcomputer 9 receives signals from shutter button 32 and power button 33, and sends the instruction to the controllers according to the received signals.

Lens microcomputer 9 has a CPU (not illustrated) and memory 9a. Each of functions of the controllers can be achieved by the CPU that reads a program stored in memory 9a. For example, lens microcomputer 9 can find an absolute position of focus lens group 13 by the detection signal received from photo sensor 19. Furthermore, lens microcomputer 9 has communicator 9b and thus can send and receive information to and from body microcomputer 20.

<Lens System>

Figure 3:
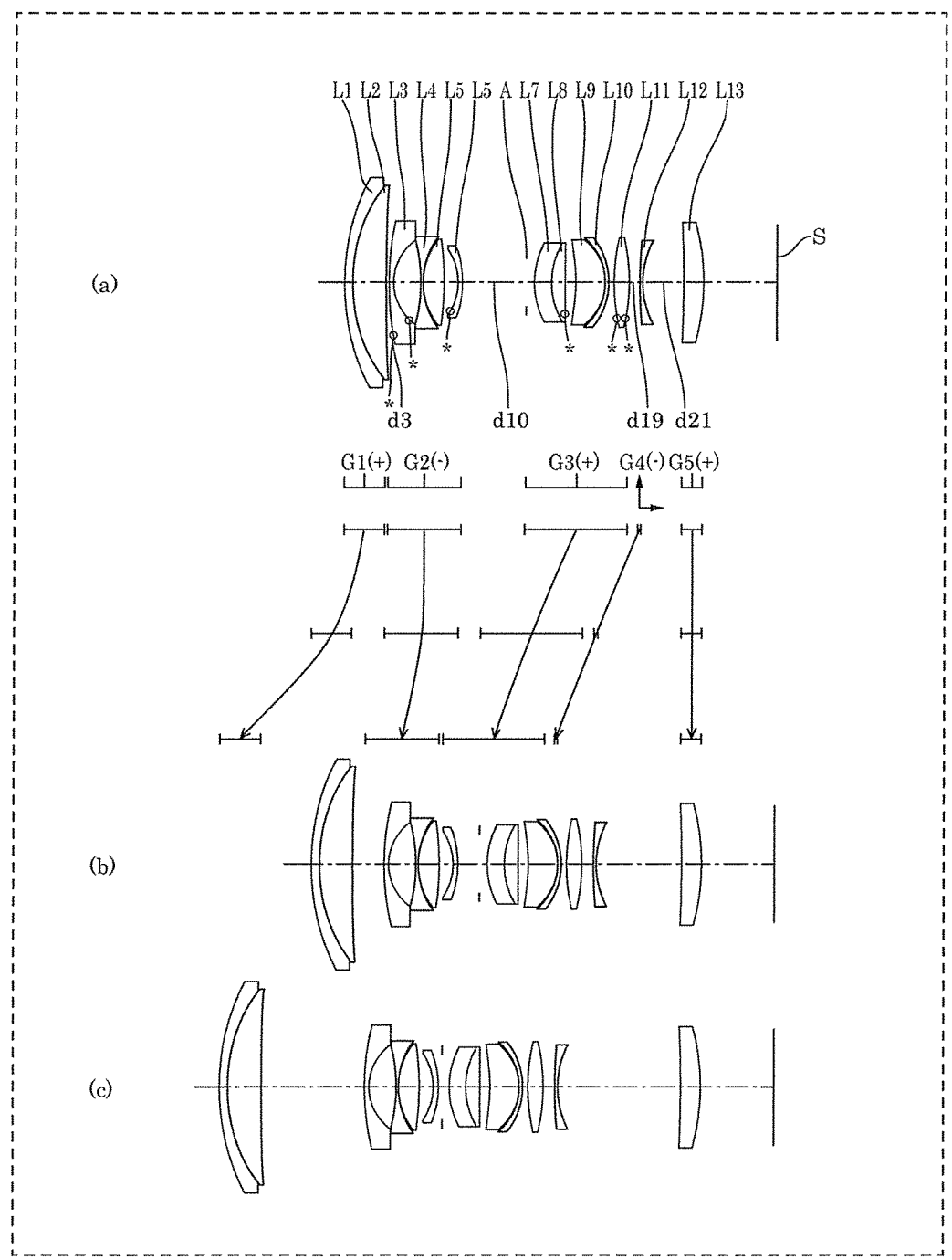
FIG. 3 is a diagram of lens arrangement showing an infinity in-focus state of a zoom lens system according to Embodiment 1.
Figure 4:
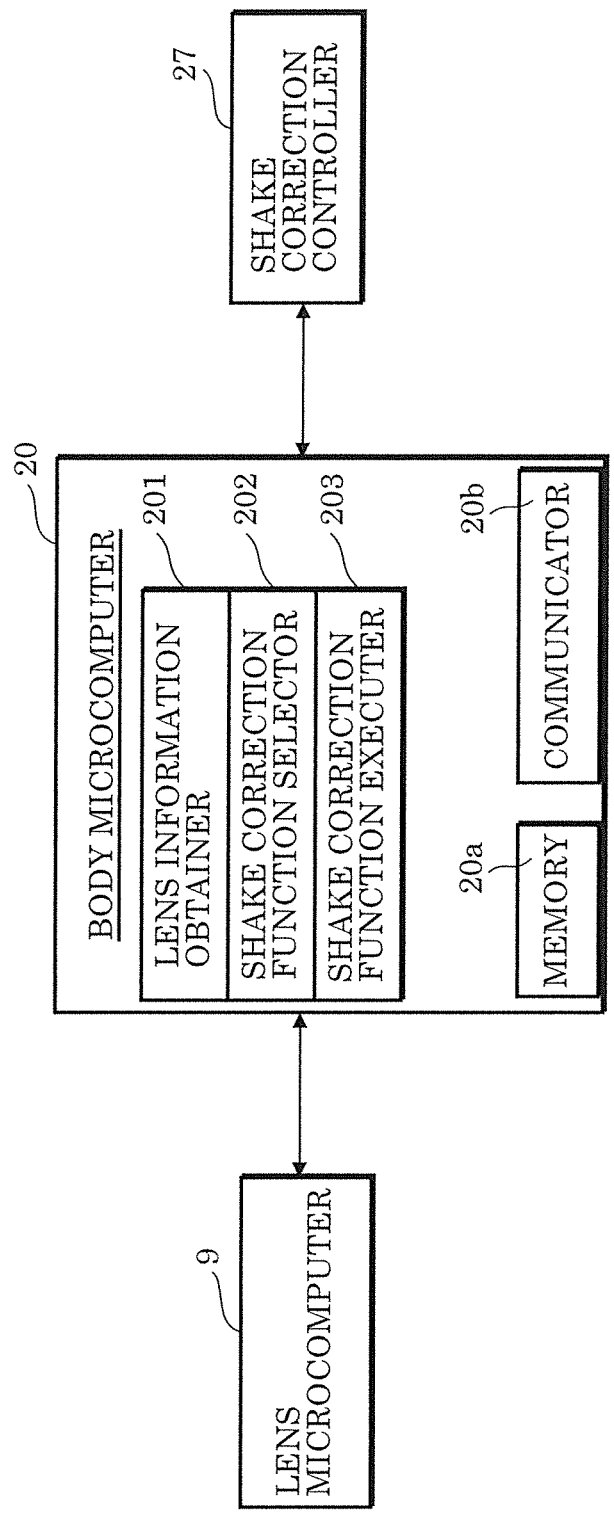
FIG. 4 is a functional block diagram of a body microcomputer of a camera body according to Embodiment 1.

As shown in FIG. 3, the lens system according to Embodiment 1 is a zoom lens system and forms an image on imaging plane S on imaging element 24.

First lens group G1 includes, in order from an object side to an imaging plane side: first lens element L1 in a negative meniscus shape having a convex surface facing toward the object side; and second lens element L2 in a positive meniscus shape having a convex surface facing toward the object side. First lens element L1 and second lens element L2 are cemented together.

Second lens group G2 includes, in order from the object side to the imaging plane side: third lens element L3 in the negative meniscus shape having a convex surface facing toward the object side; fourth lens element L4 in a biconcave shape; fifth lens element L5 in a biconvex shape; and sixth lens element L6 in the negative meniscus shape having a convex surface facing toward the imaging plane side. Among these lens elements, fourth lens element L4 and fifth lens element L5 are cemented together. Moreover, third lens element L3 has both surfaces that are aspheric, and sixth lens element L6 has an aspheric surface that faces toward the object side.

Third lens group G3 includes, in order from the object side to the imaging plane side: seventh lens element L7 in the negative meniscus shape having a convex surface facing toward the object side; eighth lens element L8 in the positive meniscus shape having a convex surface facing toward the object side; ninth lens element L9 in the positive meniscus shape having a convex surface facing toward the imaging plane side; tenth lens element L10 in the negative meniscus shape having a convex surface facing toward the imaging plane side; and eleventh lens element L11 in the biconvex shape. Among these lens elements, seventh lens element L7 and eighth lens element L8 are cemented together. Moreover, eighth lens element L8 has an aspheric surface facing toward the imaging plane side, and eleventh lens element L11 has both surfaces that are aspheric.

Fourth lens group G4 includes twelfth lens element L12 that is in the negative meniscus shape having a convex surface facing toward the object side.

Fifth lens group G5 includes thirteenth lens element L13 that is in the positive meniscus shape having a convex surface facing toward the imaging plane side.

For zooming from the wide angle end to a telephoto end at the time of imaging, the lens groups move as follows. First lens group G1, second lens group G, third lens group G3, and fourth lens group G4 move toward the object side. Fifth lens group G5 does not move. To be more specific, first lens group second lens group G2, third lens group G3, and fourth lens group G4 move along the optical axis AZ for zooming in such a manner that: a distance between first lens group G1 and second lens group G2 increases; a distance between second lens group G2 and third lens group G3 decreases; and a distance between fourth lens group G4 and fifth lens group G5 increases.

For focusing from an infinity in-focus state to a close-object in-focus state, fourth lens group G4 moves toward the imaging plane side along the optical axis AZ.

Furthermore, by causing eleventh lens element L11 to move along a direction perpendicular to the optical axis AZ, movement of an image point caused by vibration of the entire system is corrected. In other words, image blurring caused by, for example, hand movement or vibration, can be optically corrected.

[1-3. Camera Body]

As shown in FIG. 2, camera body 3 includes body microcomputer 20, shutter unit 23, imaging element 24a as an imager, in-body shake correction mechanism 25 (an example of a second shake corrector), in-body shake detector 26, in-body shake correction controller 27, shutter controller 28, image display 30, battery 31, shutter button 32, and power button 33. Image display 30 includes image display-record controller 29 and monitor 30a.

Monitor 30a is provided on a back side of camera body 3, and shutter button 32 and power button 33 are provided on a top side of camera body 3.

Power button 33 is a switch for turning on and off digital camera 1. When the power is turned on by power button 33, power is supplied to each section of camera body 3 and interchangeable lens unit 2.

Camera body 3 further includes a mode switching dial (not illustrated). The mode switch dial is used for switching an operation mode of digital camera 1, among a still image shooting mode, a video shooting mode, and a playback mode, for example. The user can switch the operation mode by rotating the mode switch dial. When the still image shooting mode is selected using the mode switch dial, the operation mode is switched to the still image shooting mode. When the video shooting mode is selected using the mode switch dial, the operation mode is switched to the video shooting mode. The video shooting mode basically enables video shooting. Moreover, when the playback mode is selected using the mode switch dial, the operation mode is switched to the playback mode and a shot image is displayed on monitor 30a.

Shutter button 32 is operated for shooting by the user. When shutter button 32 is operated, a timing signal is outputted to body microcomputer 20. Shutter button 32 is a dual-purpose switch that enables a half-press operation and a full-press operation. When the user performs the half-press operation, photometry processing and ranging processing are executed by body microcomputer 20. Then, when the user performs the full-press operation on shutter button 32 that is currently being half-pressed, the timing signal is sent to body microcomputer 20 and image data is obtained by imaging element 24.

<Imaging Element>

Imaging element 24 is, for example, a charge coupled device (CCD) sensor that converts an optical image formed by lens system 4 into an electric signal. Driving of imaging element 24 is controlled according to the timing signal. It should be noted that imaging element 24 may be a complementary metal oxide semiconductor (CMOS) sensor.

<Shutter Controller>

Shutter controller 28 causes shutter unit 23 to operate, according to a control signal outputted from body microcomputer 20 that receives the timing signal.

<Shake Detector and Shake Corrector>

In-body shake correction mechanism 25 supports imaging element 24 in a manner that imaging element 24 is movable. In-body shake correction mechanism 25 includes a plurality of actuators, such as a voice coil motor that corrects a shake component caused at the time of shooting. In-body shake correction controller 27 is connected to in-body shake correction mechanism 25, and drives in-body shake correction mechanism 25 to suppress a shake component caused in camera body 3 and detected by in-body shake detector 26. More specifically, according to the shake caused in camera body 3 and detected by in-body shake detector 26, imaging element 24 is rotated around the axes of the three-dimensional orthogonal coordinate system set for digital camera 1 shown in FIG. 1, in the three directions, which are the pitching, yawing, and rolling directions. Furthermore, according to the shake, imaging element 24 is translated in X, Y, and Z directions in the respective axis directions of the three-dimensional orthogonal coordinate system. With this, the shake can be corrected. In-body shake correction mechanism 25 and in-body shake correction controller 27 form an in-body shake corrector (an example of the second shake corrector).

Here, a shake component that occurs to digital camera 1 is explained. The shake component occurs to digital camera 1 by a hand movement (vibration) when the user holds the camera to shoot images. This shake component includes: rotational shake components around the axes of the three-dimensional orthogonal coordinate system set for the digital camera 1 shown in FIG. 1; and translational shake components occurring in the axis directions of the three-dimensional orthogonal coordinate system. The rotational shake components around the axes of the three-dimensional orthogonal coordinate system include pitching, yawing, and rolling components. The translational shake components occurring in the axis directions of the three-dimensional orthogonal coordinate system include X-shift, Y-shift, and Z-shift components. In other words, the shake component includes six different kinds of component. The shake correction mechanism usually corrects any one of the components other than the Z-shift component. In-body shake correction mechanism 25 according to the present embodiment is capable of correcting at least the pitching and yawing components that are included in the rotational shake component.

<Body Microcomputer>

Body microcomputer 20 includes communicator 20b, and is connected to lens microcomputer 9 via an interface. With this, body microcomputer 20 communicates with lens microcomputer 9.

Body microcomputer 20 is a control device that controls the whole of the camera body 3. Body microcomputer 20 controls each section of digital camera 1, according to operational information entered by the user. To be more specific, body microcomputer 20 has a CPU and memory 20a including a ROM and a RAM, and implements various functions with the CPU that reads a program stored in the ROM.

More specifically, body microcomputer 20 includes lens information obtainer 201, shake correction function selector 202, and shake correction function executer 203, and thereby implements the corresponding functions.

Lens information obtainer 201 obtains lens information from lens microcomputer 9, by the communication between body microcomputer 20 and lens microcomputer 9. The lens information includes, for example, information about a type of interchangeable lens unit 2 and about a shake correction function of interchangeable lens unit 2. Body microcomputer 20 stores the information about the correction function of interchangeable lens unit 2 (the presence or absence of the correction function and the type of the correction function) into memory 20a.

Shake correction function selector 202 determines, from the lens information obtained from lens information obtainer 201, whether interchangeable lens unit 2 that is attached includes a shake correction function, for example. Then, according to a result of the determination, shake correction function selector 202 selects shake detection and shake correction to be executed in the camera body 3. To be more specific, assume that it is determined that interchangeable lens unit 2 has the shake correction function and that the information about a method of sharing with an in-body shake correction function is present. In this case, shake correction function selector 202 makes a selection so that sharing control between in-lens shake correction and in-body shake correction can be performed.

Shake correction function executer 203 executes shake detection and shake correction selected by shake correction function selector 202. Moreover, when a hand movement correction function is provided for the lens unit, shake correction function executer 203 instructs lens microcomputer 9 to execute detection and correction of the pitching and yawing components by sharing with the in-body shake correction function as appropriate. Furthermore, shake correction function executer 203 determines whether the shake correction function is enabled by the user setting. When it is determined that the shake correction function is enabled, the shake correction function is implemented in camera body 3, or in camera body 3 and interchangeable lens unit 2.

<Image Display>

Image display 30 includes monitor 30a and image display-record controller 29. Monitor 30a is a liquid crystal monitor, for example. According to an instruction from image display-record controller 29, monitor 20a displays a shot image. Display modes of monitor 30a includes: a mode in which only an image signal is displayed as a visible image; and a mode in which an image signal and information at the time of shooting are displayed as a visible image.

<Battery>

Battery 31 supplies power to each section of camera body 3, and also supplies power to interchangeable lens unit 2. Battery 31 according to the present embodiment is a rechargeable battery. It should be noted that battery 31 may be a dry-cell battery or an external power source that externally supplies power by a power cord.

[2. Operation]

Hereinafter, the shake correction function of digital camera 1 according to the present embodiment is described.

Figure 5:
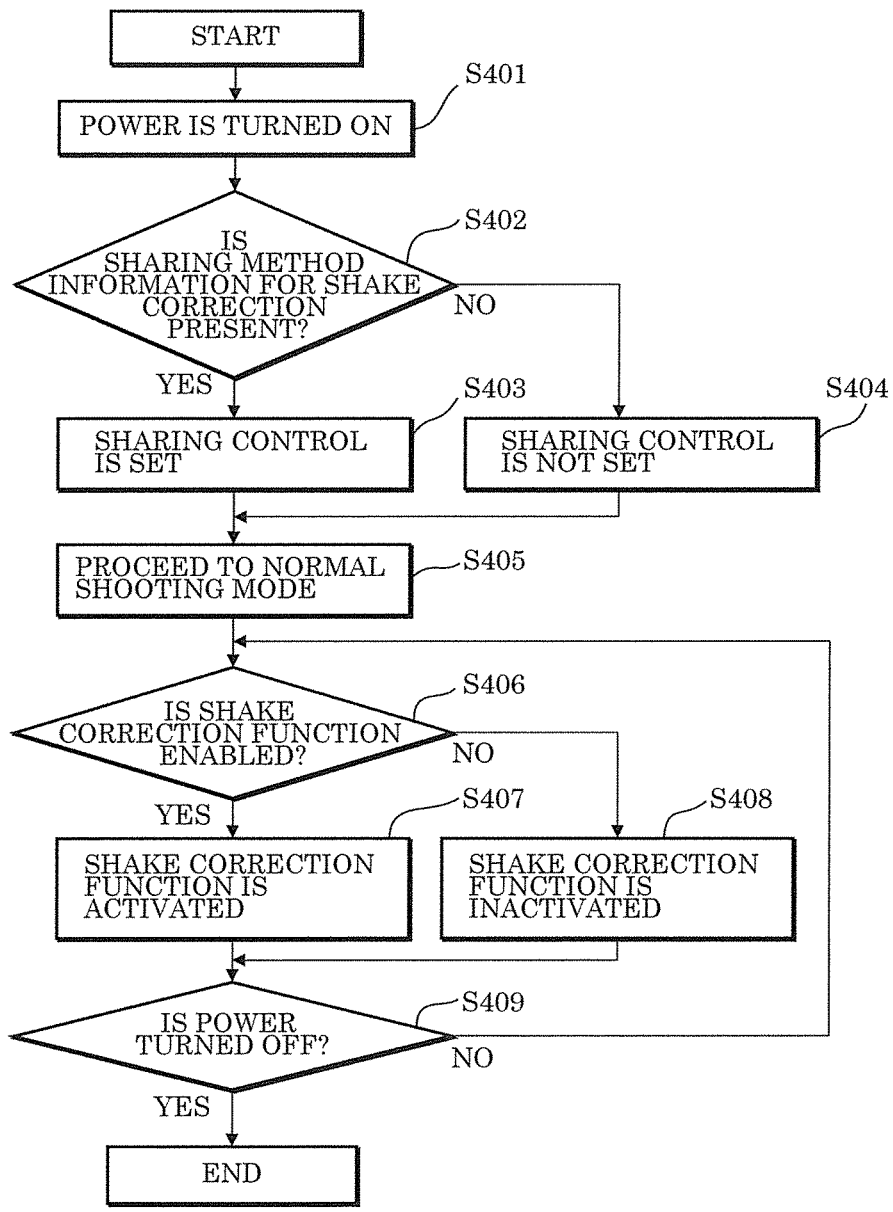
FIG. 5 is a flowchart showing control processing performed by the body microcomputer of the camera body according to Embodiment 1.

FIG. 5 is a flowchart showing a shake correction function selection operation performed mainly by body microcomputer 20 of camera body 3.

In Step S401, in response to an operation performed on power button 33 by the user, power supply from battery 31 is started and thus body microcomputer 20 starts up. Body microcomputer 20 detects that interchangeable lens unit 2 is attached. Then, communication with lens microcomputer 9 of interchangeable lens unit 2 attached to camera body 3 is started, and initialization is started. Upon the start of initialization, lens information obtainer 201 of body microcomputer 20 obtains lens information from lens microcomputer 9. The lens information includes, for example, information about a type of interchangeable lens unit 2 and about a shake correction function of interchangeable lens unit 2. Lens information obtainer 201 stores the obtained information about the correction function of interchangeable lens unit 2 (the presence or absence of the correction function and the type of the correction function) into memory 20a.

In Step S402, shake correction function selector 202 of body microcomputer 20 determines, from the lens information obtained by lens information obtainer 201, whether the information includes a method of sharing, according to a direction of shake, between the in-lens shake correction function of interchangeable lens unit 2 that is attached and the in-body shake correction function of the camera body. When it is determined that such information about the sharing method is present, the processing proceeds to Step S403. When it is determined that such information about the sharing method is not present, the processing proceeds to Step S404.

In Step S403, shake correction function selector 202 selects the sharing control between the in-lens shake correction and the in-body shake correction according to the shake direction.

In Step S404, in the case of "NO" in Step S402, shake correction function selector 202 determines that the sharing control between the in-lens shake correction and the in-body shake correction according to the shake direction is ineffective or may cause a malfunction, and thus does not select the sharing control.

In Step S405, at the completion of selection and setting of the shake correction function, the initialization is completed. Next, body microcomputer 20 proceeds to a normal shooting mode.

In Step S406, shake correction function executer 203 of body microcomputer 20 determines whether the shake correction function is enabled by the user setting. For example, the user enables or disables the shake correction function through a setting operation selected using a menu button (not illustrated). When the shake correction function is ON, shake correction function executor 203 proceeds to Step S407. When the shake correction function is OFF, shake correction function executor 203 proceeds to Step S408.

In Step S407, shake correction function executor 203 activates the shake correction function to make the shake correction function operational. In this case, the shake component is corrected by in-body shake correction controller 27 and in-body shake correction mechanism 25 of camera body 3 and in-lens shake correction controller 7 and in-lens shake correction mechanism 16a of interchangeable lens unit 2.

In Step S408, in the case of "NO" in Step S406, shake correction function executor 203 inactivates the shake correction function to disable the shake correction function. In this case, shake correction is not executed by the camera body or the lens unit.

In Step S409, when receiving an instruction to turn off the power (such as when the user performs a power-off operation on power button 33 or when an automatic power-off operation is executed), body microcomputer 20 turns off the power and ends the processing. Body microcomputer 20 repeats Steps S406 to S408 until the power is turned off.

[3. Effects etc.]

When shake correction is performed, the image point on the axis is stationary but the image point at an off-axis position is not. This causes the phenomenon in which off-axis image quality decreases. In this phenomenon, when an image height is higher, an amount of movement of the image point is usually larger at the off-axis position and thus has a larger influence on the decrease in image quality. With this being the situation, when a partial image that is located at an end of the image in the long-side direction and distant from the axis is compared with a partial image that is located at an end of the image in the short-side direction and relatively close to the axis, the partial image at the end in the long-side direction is more susceptible to influence of the phenomenon.

Moreover, a movement direction of the image point of the partial image that is located at the end of the image in the long-side direction on the imaging plane is described. Rotational shake around the axis that passes through the optical axis AZ and is parallel to the short side of the image is corrected by shifting the shake correction lens group and the imaging element in a direction parallel to the long side of the image and perpendicular to the optical axis AZ. In this case, however, the image point of the partial image at the end of the image in the long-side direction moves in the long-side direction. On the other hand, rotational shake around the axis that passes through the optical axis AZ and is parallel to the long side of the image is corrected by shifting the shake correction lens group and the imaging element in a direction parallel to the short side of the image and perpendicular to the optical axis AZ. In this case, however, the image point of the partial image at the end of the image in the long-side direction moves in the short-side direction.

These movements, in the two directions, of the image point of the partial image at the end of the image in the long-side direction are different in amount between in-lens shake correction and in-body shake correction. Thus, while conditions described below are satisfied, sharing control is performed between in-lens shake correction and in-body shake correction according to the shake direction. With this, the movement of the image point can be reduced, and thus a decrease in image quality can be minimized.

More specifically, assume that an image generated by imaging element 24 is recorded as a rectangular image. In this case, in-lens shake correction controller 7 drives in-lens shake correction mechanism 16a in a manner that the amount of movement of shake correction lens group 11 with respect to the rotational shake around the axis that passes through the optical axis AZ and is parallel to the short side of the image is larger than the amount of movement of shake correction lens group 11 with respect to the rotational shake around the axis that passes through the optical axis AZ and is parallel to the long side of the image. Moreover, in-body shake correction controller 27 drives in-body shake correction mechanism 25 in a manner that the amount of movement of imaging element 24 with respect to the rotational shake around the axis that passes through the optical axis AZ and is parallel to the short side of the image is smaller than the amount of movement of imaging element 24 with respect to the rotational shake around the axis that passes through the optical axis AZ and is parallel to the long side of the image.

In this way, the shake correction lens group and the imaging element are shifted by the respective amounts according to the rotational direction of the rotational shake. This can reduce not only the movement of the image point on the axis, but also the movement of the image point at the off-axis position.

The following describes conditions that can be satisfied by a shake correction control method as in the case of the shake correction control method according to the present embodiment, for example.

It should be noted that although a plurality of possible conditions are defined for the shake correction control method according to the embodiment, the shake correction control method having a structure that satisfies all the conditions is the most effective. However, it is possible to obtain a shake correction control method that satisfies an individual condition and thereby achieves a corresponding effect.

For example, as in the case of the shake correction control method according to the embodiment, the method is used for a camera which includes: a lens system; an imaging element that converts light from the lens system into an electric signal to generate an image; a first shake corrector that causes a shake correction lens group formed from a part of the lens system to move perpendicularly to the optical axis AZ; and a second shake corrector that causes the imaging element to move perpendicularly to the optical axis AZ. Here, assume that a rectangular image is to be recorded. In this case, the first shake corrector drives the shake correction lens group in a manner that the amount of movement of the shake correction lens group with respect to the rotational shake around the axis that passes through the optical axis and is parallel to the short side of the image is larger than the amount of movement of the shake correction lens group with respect to the rotational shake around the axis that passes through the optical axis and is parallel to the long side of the image. Moreover, the second shake corrector drives the imaging element in a manner that the amount of movement of the imaging element with respect to the rotational shake around the axis that passes through the optical axis and is parallel to the short side of the image is smaller than the amount of movement of the imaging element with respect to the rotational shake around the axis that passes through the optical axis and is parallel to the long side of the image. This shake correction control method satisfies Conditions (1) to (4) described below.

$$0 \leq |L_l \times Y_s/(L_s \times Y_l)| < 1 \quad (1)$$

In the above condition, $L_l$ represents an amount of movement of the shake correction lens group with respect to a unit rotational shake around the axis that passes through the optical axis AZ and is parallel to the long side of the image, $Y_l$ represents a length of the long side of the rectangular image to be recorded, $L_s$ represents an amount of movement of the shake correction lens group with respect to a unit rotational shake around the axis that passes through the optical axis AZ and is parallel to the short side of the image, and $Y_s$ represents a length of the short side of the rectangular image to be recorded.

Condition (1) defines a relationship between: a sharing ratio of the amount of movement of the shake correction lens group with respect to the unit rotational shake, according to the rotational direction; and an aspect ratio of the rectangular image to be recorded. When the value exceeds an upper limit of Condition (1), correction performed by the shake correction lens group to correct the unit rotational shake around the axis that passes through the optical axis AZ and is parallel to the long side of the image becomes larger than correction performed by the shake correction lens group to correct the unit rotational shake around the axis that passes through the optical axis AZ and is parallel to the short side of the image. This means that control by sharing with in-body shake correction cannot be satisfactorily achieved. In addition, the aspect ratio cannot be set appropriately, and it is difficult to reduce the movement of the image point at the off-axis position.

It should be noted that further satisfaction of Condition (1)' below can achieve the aforementioned effect more.

$$0 \leq |L_l \times Y_s/(L_s \times Y_l)| < 0.3 \quad (1)'$$

Moreover, it is preferable for the shake correction control method according to the embodiment to satisfy Condition (2) below.

$$0 \leq |S_s \times Y_s/(S_l \times Y_l)| < 1 \quad (2)$$

In the above condition, $S_l$ represents an amount of movement of the imaging element with respect to the unit rotational shake around the axis that passes through the optical axis AZ and is parallel to the long side of the image, and $S_s$ represents an amount of movement of the imaging element with respect to the unit rotational shake around the axis that passes through the optical axis AZ and is parallel to the short side of the image.

Condition (2) defines a relationship between: a sharing ratio of the amount of movement of the imaging element with respect to the unit rotational shake, according to the rotational direction; and an aspect ratio of the rectangular image to be recorded. When the value exceeds an upper limit of Condition (2), correction performed by the imaging element to correct the unit rotational shake around the axis that passes through the optical axis AZ and is parallel to the short side of the image becomes larger than correction performed by the imaging element to correct the unit rotational shake around the axis that passes through the optical axis AZ and is parallel to the long side of the image. This means that control by sharing with in-lens shake correction cannot be satisfactorily achieved. In addition, the aspect ratio cannot be set appropriately, and it is difficult to reduce the movement of the image point at the off-axis position.

It should be noted that further satisfaction of Condition (2)' below can achieve the aforementioned effect more.

$$0 \leq |S_s \times Y_s/(S_l \times Y_l)| < 0.3 \quad (2)'$$

Moreover, it is preferable for the shake correction control method according to the embodiment to satisfy Condition (3) below.

$$\text{Dist} < -0.02 \quad (3)$$

In the above condition,

Dist represents distortion aberration of the lens system.

Condition (3) defines distortion aberration of the lens system. Even when the lens system has distortion aberration, recent improvement in electronic distortion correction technology used for digital cameras has allowed such distortion aberration to be easily corrected. With distortion aberration, the size and cost of the lens system can be reduced, and a competitive imaging device can be provided. It is also known that the movement of the image point at the off-axis position caused in shake correction can be reduced more when negative distortion aberration is larger. On account of this, it is preferable to have negative distortion aberration. When the value exceeds an upper limit of Condition (3), it is difficult to reduce the size and cost of the lens system. In addition, it is difficult to reduce the movement of the image point at the off-axis position.

It should be noted that further satisfaction of Condition (3)' below can achieve the aforementioned effect more.

$$Dist < -0.05 \quad (3)'$$

Moreover, it is preferable for the shake correction control method according to the embodiment to satisfy Condition (4) below.

$$1 < f \tan \omega / Y \quad (4)$$

In the above condition, f represents a focal length of the lens system,

ω represents a half angle of view of the lens system, and

Y represents an image height.

Condition (4) defines a relationship among the focal length of the lens system, the half angle of view of the lens system, and the image height. When the value falls below a lower limit of this condition, the focal length becomes too short with respect to the image height and the angle of view becomes too narrow. Thus, it is difficult to reduce the movement of the image point at the off-axis position.

NUMERICAL EXAMPLES

Hereinafter, numerical examples are described in each of which a zoom lens system to be used in the shake correction control method according to Embodiment 1 was specifically implemented. The numerical examples include Examples 1 to 3. Note that a basic lens structure is the same in these examples and that only an amount of drive for shake correction is different for each of the examples. In each of Examples 1 to 3, sharing control was performed between in-lens shake correction and in-body shake correction according to a shake direction.

It should be noted that a unit of length used in tables in the numerical examples is "millimeter (mm)", and that a unit of angle of view is "° (degree)". In the numerical examples, r represents a radius of curvature and d represents a surface distance. Moreover, nd represents a refractive index to a d-line, and vd represents Abbe number to the d-line. Furthermore, in the numerical examples, a surface marked with * (asterisk) is aspheric and an aspheric shape is defined by an expression below.

$$Z = \frac{h^2/r}{1 + \sqrt{1 - (1+\kappa)(h/r)^2}} + \sum A_n h^n \quad [\text{Math. 1}]$$

Here, κ represents a conic constant. Moreover, A4, A6, A8, and A10 represent fourth-, sixth-, eighth-, and tenth-order aspherical coefficients, respectively.

Figure 6:
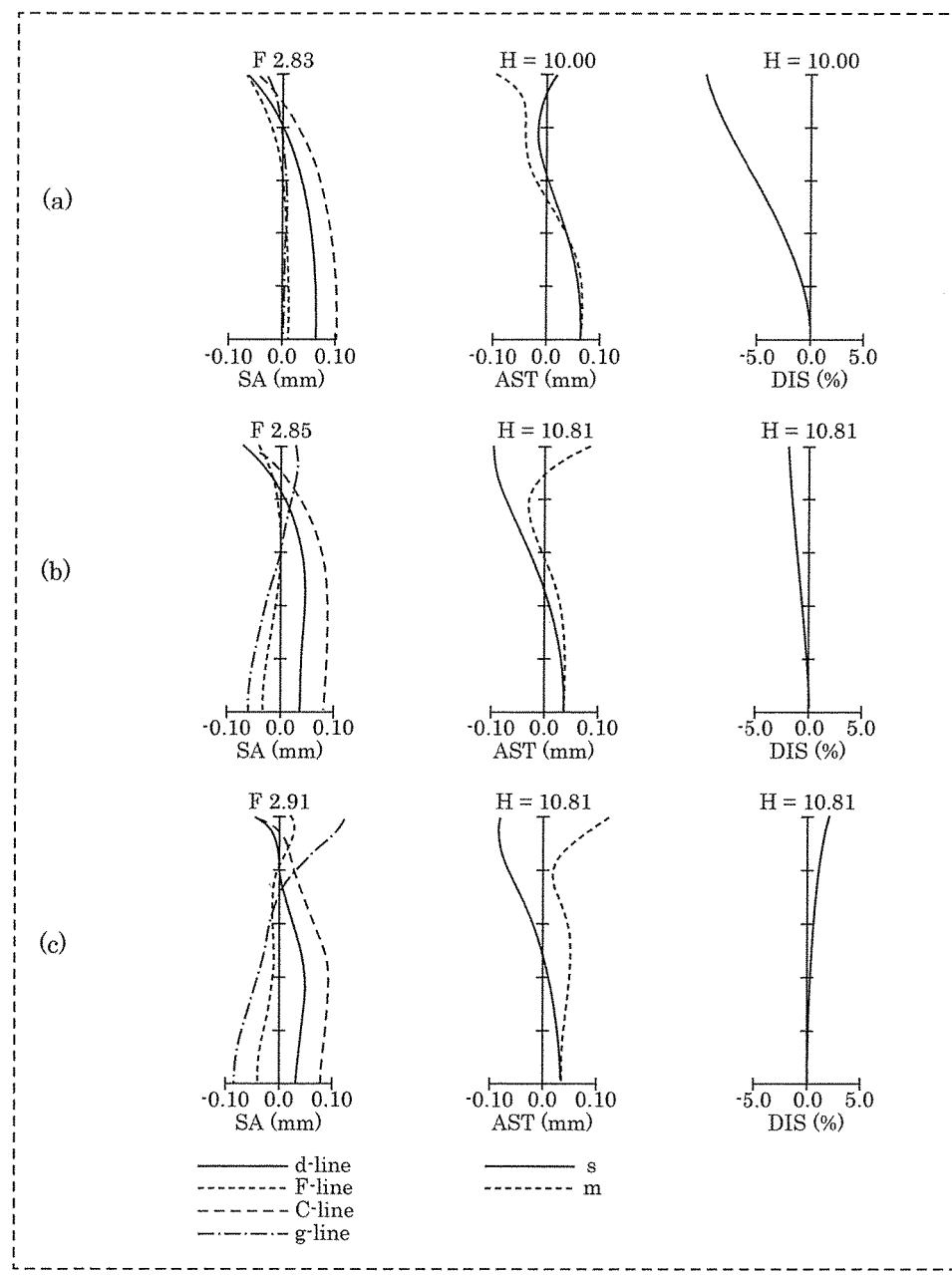
FIG. 6 is a diagram showing longitudinal aberrations in the infinity in-focus state of the zoom lens system according to the embodiment.

FIG. 6 is a diagram showing longitudinal aberrations of the zoom lens system according to Embodiment 1.

In this longitudinal aberration diagram, (a) shows aberration at a wide angle end, (b) shows aberration at a middle position, and (c) shows aberration at a telephoto end. In each of (a), (b), and (c), spherical aberration (SA [mm]), astigmatic aberration (AST [mm]), and distortion aberration (DIS [%]) are shown in order from the left-hand side. In the spherical aberration diagram, a vertical axis represents an F-number (indicated as "F" in the diagram), a solid line represents characteristics of a d-line, and a short dashed line represents characteristics of an F-line. Moreover, a long dashed line represents characteristics of a C-line, and an alternate long and short dashed line represents characteristics of a g-line. In the astigmatic aberration diagram, a vertical axis represents an image height (indicated as "H" in the diagram), a solid line represents characteristics of a sagittal plane (indicated as "s" in the diagram), and a dashed line represents characteristics of a meridional plane (indicated as "m" in the diagram). In the distortion aberration diagram, a vertical axis represents an image height (indicated as "H" in the diagram).

Figure 7:
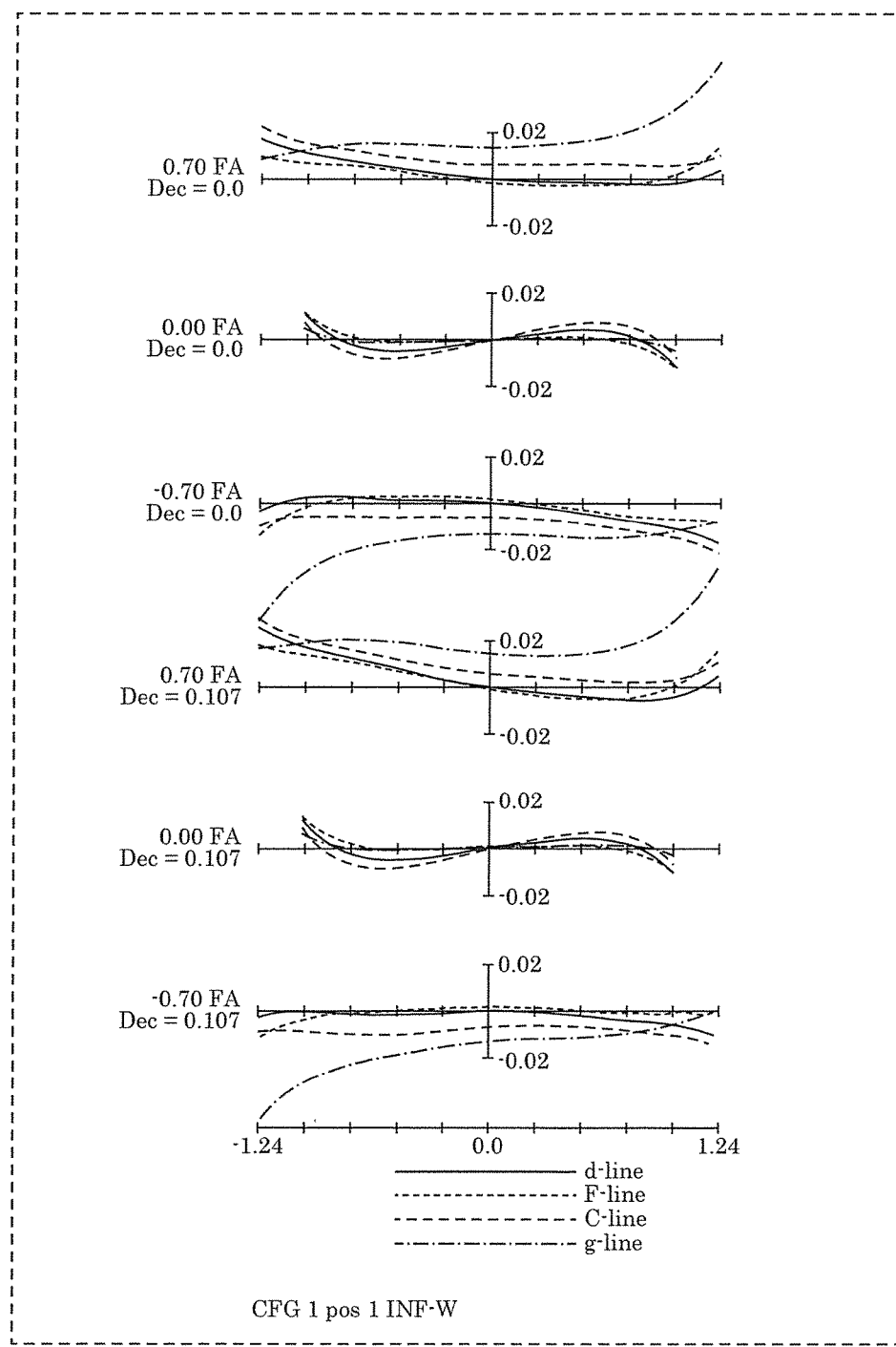
FIG. 7 is a diagram showing lateral aberrations in a basic state in which shake correction is not performed at a wide angle end of the zoom lens system, and in a shake correction state in which shake correction is performed by shifting a shake correction lens group, according to the present embodiment.
Figure 8:
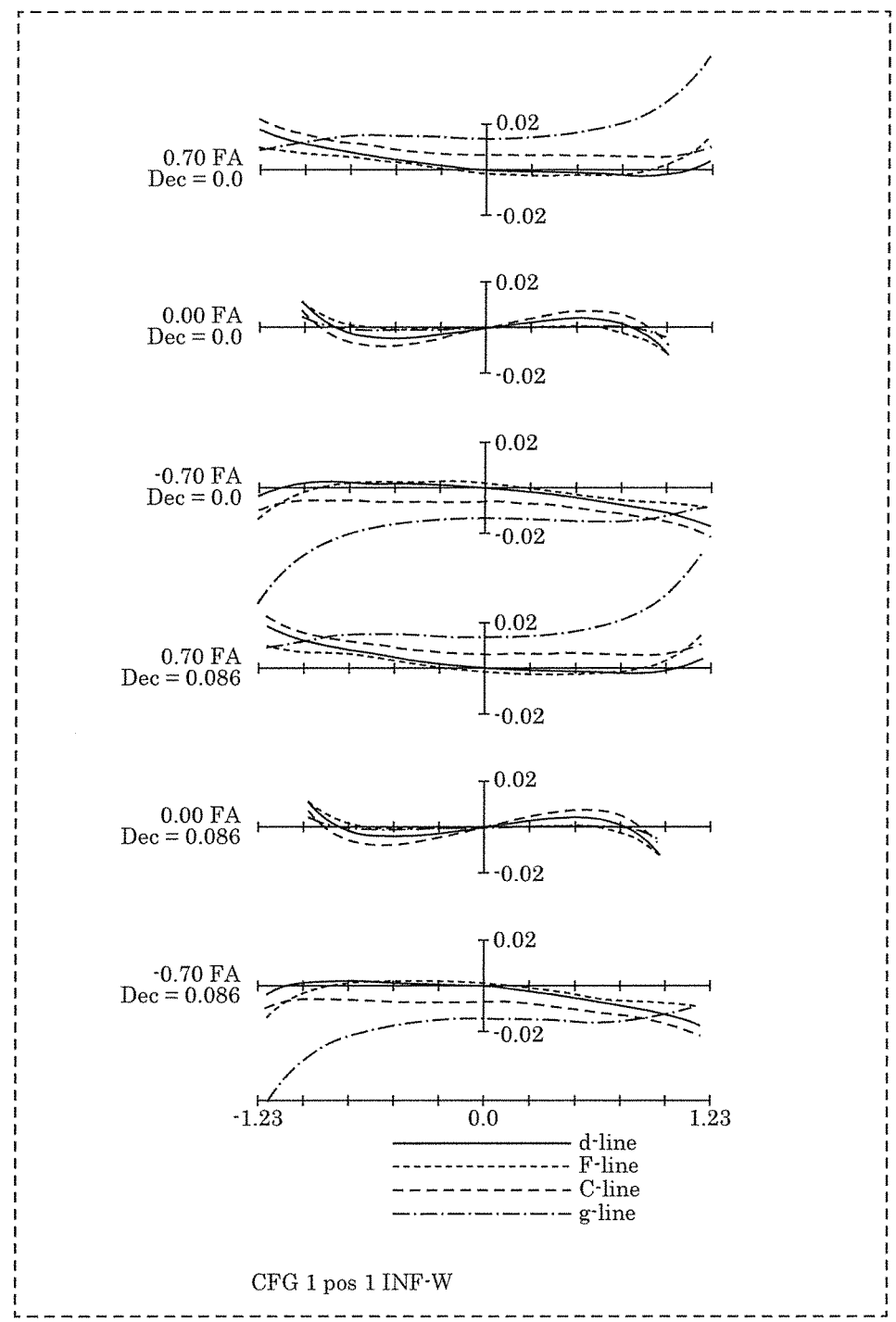
FIG. 8 is a diagram showing lateral aberrations in a basic state in which shake correction is not performed at a wide angle end of the zoom lens system, and in a shake correction state in which shake correction is performed by shifting an imaging element, according to the present embodiment.

Each of FIG. 7 and FIG. 8 is a diagram showing lateral aberrations at a wide angle end in the case where the zoom lens system according to Examples 1 to 3 is used.

In the lateral aberration diagrams, each of upper three parts shows a basic state in which shake correction is not performed at a wide angle end. Moreover, each of lower three parts of FIG. 7 shows a state in which shake correction is performed at a wide angle end by moving the shake correction lens group by 0.107 mm in a direction perpendicular to the optical axis AZ. Furthermore, each of lower three parts of FIG. 8 shows a state in which shake correction is performed at a wide angle end by moving the imaging element by 0.086 mm in the direction perpendicular to the optical axis AZ. Among the parts showing the lateral aberrations in the basic state, the top part corresponds to a lateral aberration of an image point at a position of 70% relative to a maximum image height, the middle part corresponds to a lateral aberration at an axial image point, and the lower part corresponds to a lateral aberration of an image point at a position of −70% relative to the maximum image height. Among the parts showing the lateral aberrations in the shake correction state, the top part corresponds to a lateral aberration of an image point at a position of 70% relative to a maximum image height, the middle part corresponds to a lateral aberration at an axial image point, and the lower part corresponds to a lateral aberration of an image point at a position of −70% relative to the maximum image height. Furthermore, in each of the lateral aberration diagrams, a horizontal axis represents a distance from a principal ray on a pupil surface. Moreover, a solid line, a short dashed line, and a long dashed line in the diagrams represent characteristics of a d-line, characteristics of an F-line, and characteristics of a C-line, respectively. In each of the lateral aberration diagrams, the meridional plane includes the optical axis AZ of first lens group G1 and the optical axis AZ of fourth lens group G4.

When the zoom lens system is tilted by only 0.4° at an infinity in-focus position at a wide angle end, an amount of eccentricity of the image is equal to an amount of eccentricity of the image that is caused when the shake correction lens group or the imaging element is moved in a parallel fashion by the aforementioned corresponding value in the direction perpendicular to the optical axis AZ.

As can be seen in the lateral aberration diagrams of FIG. 7 and FIG. 8, symmetry of the lateral aberrations at the axial image points is favorable. Here, comparisons are made between the lateral aberrations of the image points at the +70% positions in the basic states and between the lateral aberrations of the image points at the −70% positions in the basic states. Since each of the curvatures is small and slopes of the aberration curves are nearly the same, it can be understood that an eccentric coma aberration and an eccentric astigmatic aberration are small. This means that sufficient axial imaging performance is obtained even in the shake correction state. In Examples 1 to 3, two kinds of shake correction, that is, in-lens shake correction and in-body shake correction, are performed on a sharing basis according to the shake direction. On this account, the lateral aberrations at the time of shake correction do not become worse than those shown in the respective lower three parts of the lateral aberration diagrams in FIG. 7 and FIG. 8. Thus, sufficient axial imaging performance is obtained even in the shake correction state, as in Comparative Examples 1 and 2 described later.

Figure 11:
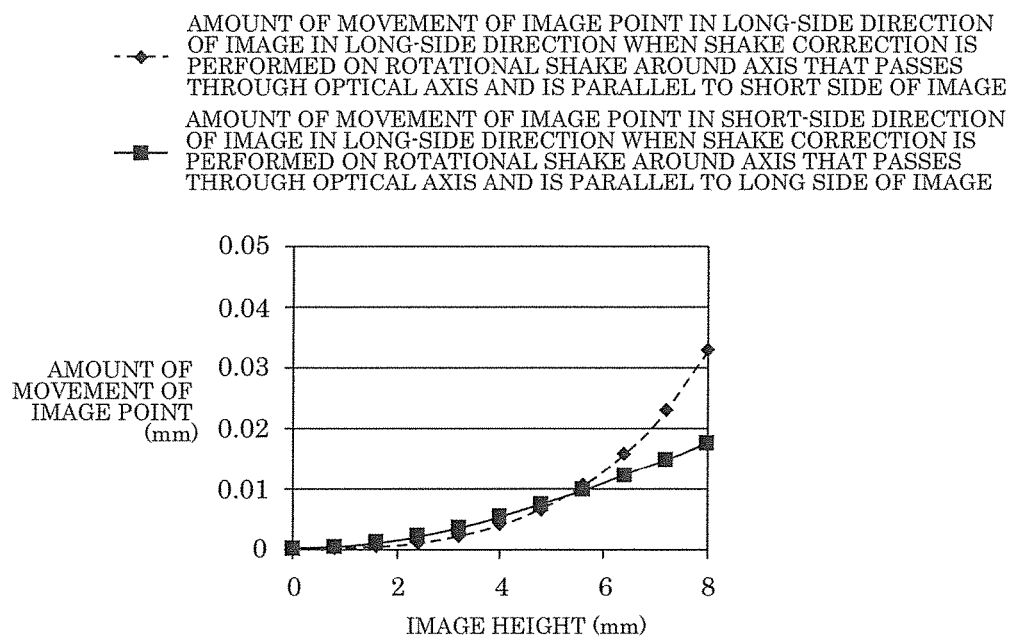
FIG. 11 is a diagram for describing a relationship between an amount of movement of an image point caused in shake correction at a wide angle end of a zoom lens system and an image height in a long-side direction, according to Numerical Example 3.

FIG. 9 to FIG. 11 are diagrams each of which shows a relationship between an amount of movement of an image point caused in shake correction at the wide angle end of the zoom lens system and an image height in a long-side direction, according to Numerical Examples 1 to 3. In each of the diagrams, a solid line represents an amount of movement, in the long-side direction, of an image point of a partial image in the long-side direction (a dot at a position close to the short side) when shake correction is performed on rotational shake around the axis that passes through the optical axis AZ and is parallel to the short side of the image. Moreover, a dotted line represents an amount of movement, in the short-side direction, of an image point of a partial image in the long-side direction when shake correction is performed on rotational shake around the axis that passes through the optical axis AZ and is parallel to the long side of the image.

Surface data of the zoom lens system according to Numerical Examples 1 to 3 (Embodiment 1) is shown in Data 1, and aspheric surface data of this zoom lens system is shown in Data 2. Moreover, various data of the zoom lens system other than the data related to shake correction is shown in Data 3, and zoom lens data of the zoom lens system is shown in Data 4.

| Data 1 (Surface data) | | | | |
|---|---|---|---|---|
| Surface number | r | d | nd | vd |
| Object surface | ∞ | | | |
| 1 | 46.56480 | 1.50000 | 1.84666 | 23.8 |
| 2 | 31.80790 | 6.46400 | 1.77250 | 49.6 |
| 3 | 194.87370 | Variable | | |
| 4* | 133.72500 | 1.00000 | 1.88202 | 37.2 |
| 5* | 11.99180 | 5.11050 | | |
| 6 | −40.62420 | 0.70000 | 1.70154 | 41.1 |
| 7 | 16.72220 | 3.88980 | 1.92286 | 20.9 |
| 8 | −52.04510 | 2.59450 | | |
| 9* | −12.84400 | 1.00000 | 1.80610 | 40.7 |
| 10 | −19.95800 | Variable | | |
| 11 (Aperture) | ∞ | 1.50000 | | |
| 12 | 19.13050 | 3.08930 | 1.84666 | 23.8 |
| 13 | 14.31570 | 2.84000 | 1.58913 | 61.3 |
| 14* | −277.48550 | 1.99460 | | |
| 15 | −33.06230 | 5.68070 | 1.59282 | 68.6 |
| 16 | −11.77870 | 0.70000 | 1.92286 | 20.9 |
| 17 | −14.70730 | 1.00000 | | |
| 18* | 28.58940 | 2.96360 | 1.51845 | 70.0 |
| 19* | −44.72510 | Variable | | |
| 20 | 65.42230 | 0.70000 | 1.74950 | 35.0 |
| 21 | 18.62770 | Variable | | |
| 22 | −226.93210 | 3.95860 | 1.84666 | 23.8 |
| 23 | −45.58570 | BF | | |
| Image surface | ∞ | | | |

Data 2 (Aspheric surface data)

4th surface $K = 0.00000E+00$, $A4 = 6.64668E-05$, $A6 = -2.84118E-07$, $A8 = 6.25525E-10$
$A10 = 0.00000E+00$ 5th surface $K = 0.00000E+00$, $A4 = 5.54426E-05$, $A6 = 1.90885E-07$, $A8 = 2.57948E-09$
$A10 = -4.89308E-12$ 9th surface $K = 0.00000E+00$, $A4 = 2.01586E-05$, $A6 = 3.61764E-07$, $A8 = -3.69683E-09$
$A10 = 1.91593E-11$ 14th surface $K = 0.00000E+00$, $A4 = 9.23458E-05$, $A6 = 1.59711E-07$, $A8 = 9.09639E-10$
$A10 = -1.77556E-11$ -continued 18th surface K = 0.00000E+00, A4 = −2.85196E−05, A6 = −2.27314E−08, A8 = 1.43135E−10
A10 = −1.08350E−12

19th surface

K = 0.00000E+00, A4 = −1.05035E−05, A6 = −1.75961E−08, A8 = −1.49536E−10
A10 = 0.00000E+00

Data 3 (Various data other than data related to shake correction)
Zoom ratio 2.75039

|  | Wide-angle | Middle | Telephoto |
|---|---|---|---|
| Focal length | 12.3628 | 20.5037 | 34.0025 |
| F-number | 2.82859 | 2.85057 | 2.91257 |
| Half angle of view | 41.9636 | 28.2703 | 17.3406 |
| Image height | 10.0000 | 10.8150 | 10.8150 |
| Image height in long-side direction | 8.0000 | 8.6520 | 8.6520 |
| Image height in short-side direction | 6.0000 | 6.4890 | 6.4890 |
| Entire optical length | 84.4390 | 90.7009 | 108.5390 |
| d3 | 0.6000 | 6.3474 | 20.3334 |
| d10 | 12.7430 | 4.5346 | 1.0000 |
| d19 | 2.0000 | 2.4285 | 2.0000 |
| d21 | 8.0000 | 16.2944 | 24.1096 |
| Entrance pupil position | 18.4284 | 25.5267 | 54.8371 |
| Exit pupil position | −66.5649 | −101.2176 | −157.4588 |
| Front principal point position | 28.4973 | 41.8785 | 81.4984 |
| Rear principal point position | 72.1413 | 70.2338 | 74.5687 |

Data 4 (Zoom lens group data)

| Group | Initial surface | Focal length | Length of lens group | Front principal point position | Rear principal point position |
|---|---|---|---|---|---|
| 1 | 1 | 81.90412 | 7.96400 | −1.60513 | 2.00956 |
| 2 | 4 | −12.82855 | 14.29480 | 1.44731 | 5.10202 |
| 3 | 11 | 16.16475 | 19.76820 | 10.80729 | 13.61390 |
| 4 | 20 | −34.97114 | 0.70000 | 0.56300 | 0.86030 |
| 5 | 22 | 66.70830 | 3.95860 | 2.65593 | 4.49212 |

Comparative Examples

Next, comparative examples are described in which sharing control of shake corrections is not performed. Here, a basic lens structure is the same in these comparative examples and only an amount of driving to perform shake correction is different for each of the comparative examples. Amounts of driving of the shake correction lens and the imaging element for shake correction are shown in Table 1.

In Comparative Example 1, sharing control of shake correction is not performed, and shake correction is performed by driving only the shake correction lens. The result is shown in (a) of FIG. 12.

In Comparative Example 2, sharing control of shake correction is not performed, and shake correction is performed by driving only the imaging element. The result is shown in (b) of FIG. 12.

In FIG. 12, (a) and (b) show relationships between an amount of movement of an image point caused in shake correction and an image height in the long-side direction, according to Comparative Examples 1 and 2. In FIG. 12, a solid line represents an amount of movement, in the long-side direction, of an image point of a partial image in the long-side direction (a dot at a position close to the short side) when shake correction is performed on rotational shake around the axis that passes through the optical axis AZ and is parallel to the short side of the image. Moreover, a dotted line represents an amount of movement, in the short-side direction, of an image point of a partial image in the long-side direction when shake correction is performed on rotational shake around the axis that passes through the optical axis AZ and is parallel to the long side of the image.

As compared with (a) and (b) of FIG. 12 according to the comparative examples, it is clearly understood from FIG. 9 to FIG. 11 in Examples 1 to 3 according to Embodiment 1 that the amount of movement of the image point can be reduced and that the sharing control of shake correction according to the present embodiment proves effective.

Table 1 below shows data of the amounts of movement (the amounts of shift) of the shake correction lens and the imaging element when shake correction is performed.

(Shake-Correction Related Data)

TABLE 1

| Correction mechanism | Rotation axis of shake | Example 1 | Example 2 | Example 3 | Comparative Example 1 | Comparative Example 2 |
|---|---|---|---|---|---|---|
|  |  | Amount of shift |  |  |  |  |
| Lens | Axis parallel to long side | 0.000 | 0.021 | 0.043 | 0.107 | 0.000 |
| Lens | Axis parallel to short side | 0.107 | 0.086 | 0.064 | 0.107 | 0.000 |
| Imaging element | Axis parallel to long side | 0.086 | 0.069 | 0.052 | 0.000 | 0.086 |

TABLE 1-continued

| Correction mechanism | Rotation axis of shake | Example 1 | Example 2 | Example 3 | Comparative Example 1 | Comparative Example 2 |
|---|---|---|---|---|---|---|
| | | | | Amount of shift | | |
| Imaging element | Axis parallel to short side | 0.000 | 0.017 | 0.034 | 0.000 | 0.086 |

Table 2 below shows a corresponding value for each of Conditions to be satisfied by the zoom lens system according to Numerical Examples.
(Corresponding Value of Conditions)

TABLE 2

| Number of example | (1) | (2) | (3) | (4) |
|---|---|---|---|---|
| 1 | 0.000 | 0.000 | −0.099 | 1.112 |
| 2 | 0.188 | 0.188 | −0.099 | 1.112 |
| 3 | 0.500 | 0.500 | −0.099 | 1.112 |

Other Embodiments

As an example of technology to be disclosed in the present application, the embodiment has been described thus far. However, the technology according to the present disclosure is not intended to be limiting. The technology can be applied to embodiments in which changes, replacements, additions, and omissions, for example, are made as appropriate. Furthermore, another embodiment may be implemented through a combination of components described in the embodiment described above.

For example, although the shake correction sharing function is selected in interchangeable lens unit 2 according to the above embodiment, the shake detection information may be obtained from camera body 3. In this case, shake correction function executer 203 of body microcomputer 20 in camera body 3 (FIG. 4) may obtain the information of shake detected by in-body shake detector 26 and transmit this shake detection information to lens microcomputer 9 so that shake component correction is performed in interchangeable lens unit 2 on the basis of the shake detection information.

Moreover, the above embodiment has been described as the shake correction control method used for the camera system that includes interchangeable lens unit 2 and camera body 3. However, the lens unit may be built into the camera body to form an integrated camera. In this case, a part or a whole of lens microcomputer 9 and a part or a whole of body microcomputer 20 may be formed as a common microcomputer. Furthermore, in-lens shake detector 15 and in-body shake detector 26 may be formed as a common detector.

Moreover, sharing between in-lens shake correction and in-body shake correction at the wide angle end has been described according to the above embodiment. However, sharing may also be implemented at different focal length regions as in the case of the wide angle end. Alternatively, sharing ratios of the amounts of shift caused in the respective corrections may be changed.

Each of the processes according to the above embodiment may be implemented in the form of hardware or software, or implemented by a combination of hardware and software.

Moreover, a sequence in which the processes of the method are executed according to the above embodiment is not necessarily limited to the sequence described in the above embodiment. This execution sequence can be changed unless such a change departs from the scope of the present invention.

The present invention can be used as a camera body and a camera system that have a shake correction function.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

The invention claimed is:

1. A shake correction method for a camera which includes:
    a lens system that has a plurality of lens elements;
    an imaging element that converts an optical image formed by the lens system into an electric signal to generate an image;
    a first shake corrector that causes a shake correction lens group formed from a part of the lens system to move perpendicularly to an optical axis; and
    a second shake corrector that causes the imaging element to move perpendicularly to the optical axis,
    the shake correction method comprising, when the image generated by the imaging element is to be recorded as a rectangular image:
    driving, by the first shake corrector, the shake correction lens group in a manner that an amount of movement of the shake correction lens group with respect to a rotational shake around an axis that passes through the optical axis and is parallel to a short side of the image is larger than an amount of movement of the shake correction lens group with respect to a rotational shake around an axis that passes through the optical axis and is parallel to a long side of the image; and
    driving, by the second shake corrector, the imaging element in a manner that an amount of movement of the imaging element with respect to the rotational shake around the axis that passes through the optical axis and is parallel to the short side of the image is smaller than an amount of movement of the imaging element with respect to the rotational shake around the axis that passes through the optical axis and is parallel to the long side of the image,
    wherein the shake correction method satisfies a condition (4):

$$1 < f \tan \omega / Y \qquad (4)$$

where
f represents a focal length of the lens system,
ω represents a half angle of view of the lens system, and
Y represents an image height.

2. The shake correction method according to claim 1, the method satisfying a condition (1):

$$0 \leq |L_l \times Y_s / (L_s \times Y_l)| < 1 \qquad (1),$$

where
$L_l$ represents an amount of movement of the shake correction lens group with respect to a unit rotational shake around the axis that passes through the optical axis AZ and is parallel to the long side of the image,
$Y_l$ represents a length of a long side of the rectangular image to be recorded,
$L_s$ represents an amount of movement of the shake correction lens group with respect to a unit rotational shake around the axis that passes through the optical axis AZ and is parallel to the short side of the image, and $Y_s$ represents a length of a short side of the rectangular image to be recorded.

3. The shake correction method according to claim 1, the method satisfying a condition (2):

$$0 \leq |S_s \times Y_s/(S_l \times Y_l)| < 1 \quad (2),$$

where $S_l$ represents an amount of movement of the imaging element with respect to a unit rotational shake around the axis that passes through the optical axis AZ and is parallel to the long side of the image, and $S_s$ represents an amount of movement of the imaging element with respect to a unit rotational shake around the axis that passes through the optical axis AZ and is parallel to the short side of the image.

4. The shake correction method according to claim 1, the method satisfying a condition (3):

$$\text{Dist} < -0.02 \quad (3),$$

where

Dist represents a distortion aberration of the lens system.

5. An imaging device comprising:

a lens system that has a plurality of lens elements;

an imaging element that converts an optical image formed by the lens system into an electric signal to generate an image;

a first shake corrector that causes a shake correction lens group formed from a part of the lens system to move perpendicularly to an optical axis; and a second shake corrector that causes the imaging element to move perpendicularly to the optical axis, wherein when the image generated by the imaging element is to be recorded as a rectangular image:

the first shake corrector drives the shake correction lens group in a manner that an amount of movement of the shake correction lens group with respect to a rotational shake around an axis that passes through the optical axis and is parallel to a short side of the image is larger than an amount of movement of the shake correction lens group with respect to a rotational shake around an axis that passes through the optical axis and is parallel to a long side of the image; and the second shake corrector drives the imaging element in a manner that an amount of movement of the imaging element with respect to the rotational shake around the axis that passes through the optical axis and is parallel to the short side of the image is smaller than an amount of movement of the imaging element with respect to the rotational shake around the axis that passes through the optical axis and is parallel to the long side of the image, the imaging device satisfying a condition (4):

$$1 < f \tan \omega / Y \quad (4),$$

where f represents a focal length of the lens system,

ω represents a half angle of view of the lens system, and

Y represents an image height.

6. An interchangeable lens device which is removably attached to a camera body that includes: an imaging element that converts light into an electric signal to generate an image; and a second shake corrector that causes the imaging element to move perpendicularly to an optical axis, the interchangeable lens device comprising:

a lens system that has a plurality of lens elements; and a first shake corrector that causes a shake correction lens group formed from a part of the lens system to move perpendicularly to the optical axis, wherein when the image generated by the imaging element is to be recorded as a rectangular image:

the first shake corrector drives the shake correction lens group in a manner that an amount of movement of the shake correction lens group with respect to a rotational shake around an axis that passes through the optical axis and is parallel to a short side of the image is larger than an amount of movement of the shake correction lens group with respect to a rotational shake around an axis that passes through the optical axis and is parallel to a long side of the image; and the second shake corrector drives the imaging element in a manner that an amount of movement of the imaging element with respect to the rotational shake around the axis that passes through the optical axis and is parallel to the short side of the image is smaller than an amount of movement of the imaging element with respect to the rotational shake around the axis that passes through the optical axis and is parallel to the long side of the image, the interchangeable lens device satisfying a condition (4):

$$1 < f \tan \omega / Y \quad (4)$$

where f represents a focal length of the lens system,

ω represents a half angle of view of the lens system, and

Y represents an image height.

7. A camera body to which an interchangeable lens device is removably attached, the interchangeable lens including: a lens system that has a plurality of lens elements; and a first shake corrector that causes a shake correction lens group formed from a part of the lens system to move perpendicularly to an optical axis, the camera body comprising:

an imaging element that converts an optical image formed by the lens system into an electric signal to generate an image; and a second shake corrector that causes the imaging element to move perpendicularly to an optical axis, wherein when the image generated by the imaging element is to be recorded as a rectangular image:

the first shake corrector drives the shake correction lens group in a manner that an amount of movement of the shake correction lens group with respect to a rotational shake around an axis that passes through the optical axis and is parallel to a short side of the image is larger than an amount of movement of the shake correction lens group with respect to a rotational shake around an axis that passes through the optical axis and is parallel to a long side of the image; and the second shake corrector drives the imaging element in a manner that an amount of movement of the imaging element with respect to the rotational shake around the axis that passes through the optical axis and is parallel to the short side of the image is smaller than an amount of movement of the imaging element with respect to the rotational shake around the axis that passes through the optical axis and is parallel to the long side of the image, the camera body satisfying a condition (4):

$$1 < f \tan \omega / Y \quad (4),$$

where f represents a focal length of the lens system,

ω represents a half angle of view of the lens system, and

Y represents an image height.

* * * * *